United States Patent
Southam

(10) Patent No.: US 6,594,641 B1
(45) Date of Patent: Jul. 15, 2003

(54) COMPUTER FACILITATED PRODUCT SELLING SYSTEM

(75) Inventor: Adam G. Southam, Minnetonka, MN (US)

(73) Assignee: Reshare Corporation, Hopkins, MN (US)

( * ) Notice: Subject to any disclaimer, the term of this patent is extended or adjusted under 35 U.S.C. 154(b) by 0 days.

(21) Appl. No.: 09/293,423

(22) Filed: Apr. 16, 1999

(51) Int. Cl.[7] ............................ G06F 17/60; G06F 17/00
(52) U.S. Cl. ........................................................ 705/26
(58) Field of Search ............................................ 705/26

(56) References Cited

U.S. PATENT DOCUMENTS

| | | | |
|---|---|---|---|
| 4,797,818 A | * 1/1989 | Cotter | 379/912 |
| 5,289,371 A | 2/1994 | Abel et al. | |
| 5,359,508 A | 10/1994 | Rossides | |
| 5,380,991 A | * 1/1995 | Valencia et al. | 235/383 |
| 5,638,519 A | 6/1997 | Haluska | |
| 5,694,551 A | 12/1997 | Doyle et al. | |
| 5,742,931 A | 4/1998 | Spiegelhoff et al. | |
| 5,758,327 A | 5/1998 | Gardner et al. | |
| 5,799,283 A | * 8/1998 | Francisco et al. | 705/19 |
| 5,852,809 A | 12/1998 | Abel et al. | |
| 5,860,068 A | 1/1999 | Cook | |
| 5,970,472 A | * 10/1999 | Allsop et al. | 705/26 |
| 6,026,376 A | * 2/2000 | Kenney | 705/27 |
| 6,047,268 A | * 4/2000 | Bartoli et al. | 705/35 |
| 6,105,001 A | * 8/2000 | Masi et al. | 705/14 |
| 6,112,186 A | * 8/2000 | Bergh et al. | 705/10 |
| 6,134,533 A | * 10/2000 | Shell | 705/14 |
| 6,182,050 B1 | * 1/2001 | Ballard | 705/14 |
| 6,336,100 B1 | * 1/2002 | Yamada | 705/26 |
| 6,421,648 B1 | * 7/2002 | Gagnon et al. | 705/1 |

FOREIGN PATENT DOCUMENTS

WO   WO 200062231   * 4/1999   ............ G06F/17/60

OTHER PUBLICATIONS

Business and Industry, 'There Are Holes in the Net', Mar. 1, 1999, v29, n25, p34.*

* cited by examiner

Primary Examiner—James W. Myhre
Assistant Examiner—Arthur Duran
(74) Attorney, Agent, or Firm—Moore & Hansen

(57) ABSTRACT

An apparatus and system for allowing customers to purchase boutique or specialty items directly from a supplier or wholesaler. The items for purchase are those conventionally available only through retailers such as local boutiques or specialty shops. An example would be salon quality hair care products. The system allows a customer to visit a website on a computer network, such as the Internet, and place an order for the product by providing information on which products are desired for purchase, the mailing address to which the products are to be sent, payment type, and optionally selecting a local retailer the customer enjoys frequenting to which the profits are to be directed. The supplier then processes the order and sends the customer the desired products, charging the customer normal retail prices. The supplier protects its business relationships with the local retailer by crediting the retailer for some or all of the profit the retailer normally would have received had it made the sale of the product. The recipient retailer is either chosen by using the retailer selected by the customer during the ordering process or, if a retailer was not chosen, by determining that product-carrying boutique which is geographically closest to the mailing address given by the customer.

42 Claims, 3 Drawing Sheets

COMPUTER FACILITATED PRODUCT SELLING SYSTEM

BACKGROUND OF THE INVENTION

This invention relates generally to a system for routing electronic data to effect the sales of products directly from a supplier of a line of products to a customer, using a computer network, preferably the Internet, while protecting a local distributor or retailer from loss of business. This system would allow a consumer to make supplier direct purchases of products which have traditionally been available only through retailers such as specialty shops or boutiques.

Consumers typically shop for consumable items such as groceries, cleaning supplies, household goods, and the like by keeping a written or mental list of items in need and, when the list is long enough to warrant a trip, going to a retailer and purchasing, or trying to purchase, all of the items on the list. It is usually desirable to minimize trips to a store by implementing such a system and most grocery stores try to carry a wide enough variety of products so that they can accommodate most consumers' lists.

However, certain product lines are not available from grocery, department, or variety stores. Certain hair care product lines, for example, are only available through selected hair salons that choose to carry the product. The business relationship that forms between a salon and a product line is a delicate, but mutually beneficial one. The salon acts as a live, one-on-one advertiser for the product. The beautician, while styling a customer's hair, has a captive audience. The beautician tells the customer why the product is preferred over other products and actually uses the product on the customer's hair, showing the customer how well the product works while teaching the customer how to use the product properly. When the beautician is finished with the customer's hair, the product line is available for purchase only in the salon so the customer usually buys some of the product while paying for the hair care service. This form of advertising is very valuable to the product producer.

The salon also benefits from this business relationship. The salon receives the product at wholesale prices from the supplier and sells the product at retail prices, thereby earning a profit. Since the product is not available in any other retail outlets, the salon does not have to compete with either the prices offered by large stores or the convenience of adding the product to a grocery list and buying it while at the store. Unfortunately for the consumer, when he or she needs more product, a special, sometimes lengthy trip must be made to the salon simply to buy one item. Many consumers would find it desirable to find a way to avoid such trips.

It would be advantageous to be able to purchase such products directly from the supplier, using a computer network, such that the product is mailed directly to the consumer and, at the same time, the retailer's normal profit margin from the sale, or a portion thereof would be forwarded to a predetermined salon, thereby protecting the business relationship between the supplier and the salon.

SUMMARY OF THE INVENTION

Advantageously, this invention generally provides a system for marketing and selling products over a computer network.

It is another characteristic of this invention to provide a computer system for purchasing directly from a supplier such as a factory or wholesaler, products that are not typically available from such sources.

This invention is also beneficial in that it provides an automated system for forwarding to a third party, some or all of the profits the third party could expect from an original transaction if the third party had made the transaction itself.

It is another advantage that the invention generally provides an automated system for selecting which third party retailer the profits from a factory-consumer sale should be forwarded to based on a customer identifier or customer preference.

The instant invention comprises a system which allows a customer, or end product user as used herein, to purchase a product, normally available only through retailers such as boutiques or specialty stores and not generally sold in department, grocery stores, or mass merchandisers, directly from a supplier using an electronic communications path or link, preferably a computer network. Alternatively, the link could be a telephone line, coaxial cable, fiber optic cable, or any state of the art medium over which electronic data may be sent. The customer uses a remote input device such as a computer to access the network, preferably the Internet, and visits the supplier's website. If the customer does not have access to a computer, it is envisioned that the customer contact an order entry site comprising an order entry person with a computer having access to the website. The website gives the customer a choice of products from which the customer designates those desired for purchase. The customer is then directed to provide the address to which the product is to be sent and a payment method. The customer is also given the option to select a third party retailer or store from a provided list to which the predetermined profits of the sale will be sent. The customer should choose the store from which the customer would have purchased the product had this system not been used. If the customer chooses not to select a store, the store geographically closest to the provided mailing address will be chosen automatically by the computer. After the customer has provided all of the necessary information, the customer would hit a "send" button or its equivalent, on the website which would send the order information to a central processing unit. The central processing unit is linked in electronic communication flow to at least one remote output device, preferably a computer. It is envisioned that there are remote output devices located at each supply site, such as a factory, warehouse, or wholesaler, a remote output device used for billing purposes, and a remote output device used for crediting the third party retailers for the sales of the products.

The order data is received by the supplier's computer and triggers an order processing chain of events. The information is sent to a data bank such as a hard disk drive, random access memory or other magnetic or optical data storage device where the products ordered are noted for inventory and stock replacement purposes. The corresponding products are either designated as sold from a stock inventory or added to the supplier's replacement requirements. The mailing address data is sent to the shipping department of the closest supply source where the product is packaged for shipment. The supply source could be the supplier's factory or main warehouse or one of a number of distribution sources at different locations, such as regional warehouses or distributors. The accounting department receives the data in order to bill the customer and credit the designated store. The marketing department may also access the information for demographic purposes.

DETAILED DESCRIPTION

Figure 1:
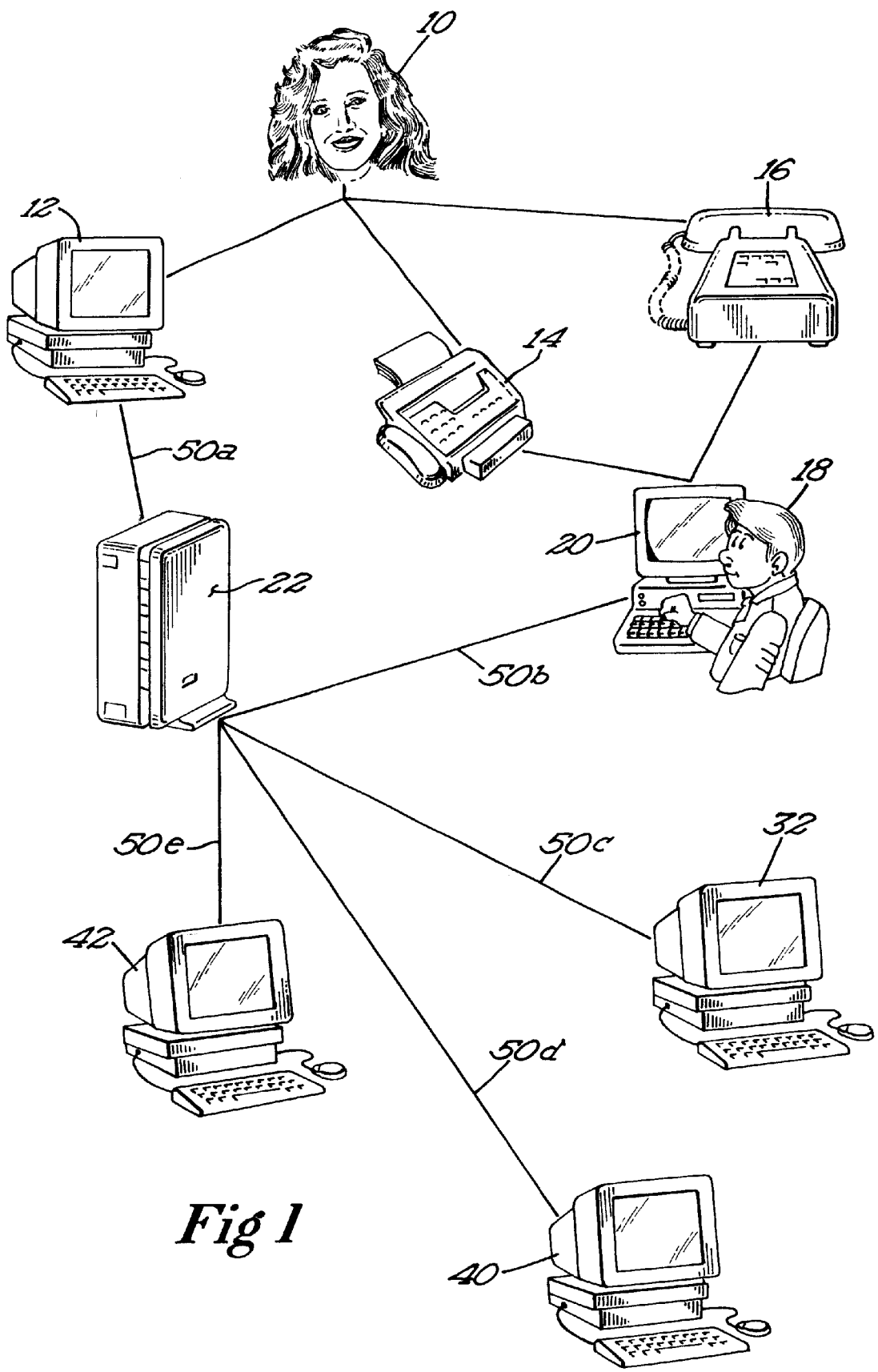
FIG. 1 is a schematic representation of the linked sites of the product selling system of the invention.

These and other objectives and advantages of the invention will appear more fully from the following description, made in conjunction with the accompanying drawings wherein like reference characters refer to the same or similar parts throughout the several views. And, although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Apparatus

With reference to the drawings, and first to FIG. 1, there is shown a central processing unit (hereinafter "CPU") 22 connected in data flow communication via links 50 to various other personal computers (hereinafter "PCs"), the first of which is consumer PC 12 which a consumer 10 can use to communicate ordering information to CPU 22. It is also envisioned that if consumer 10 does not own or have access to a consumer PC 12, an order entry site 17 comprising order entry personnel (hereinafter "OEP") 18 would be available to receive ordering information from consumer 10 via such communication devices as facsimile 14, telephone 16, or even non-electronic communication media such as the postal service. Order entry site 17 further comprises OEP PC 20 used by OEP 18 to send the ordering information to CPU 22 via link 50.

As used herein, the term "consumer" shall be treated as being interchangeable with the words "purchaser", "buyer", or "user" of goods or commodities sold. In addition, as used herein, the term "retailer" shall be taken to mean distributors, wholesalers, shippers, retailers to the public and to restricted markets or clientele, and any intermediary that is normally part of the series of transactions that results in the transfer of title and possession of a commodity from a supplier to a consumer.

CPU 22 is also connected via links 50c, 50d, and 50e to PCs which receive commands and perform functions. Billing PC 32 receives address information and invoice data from CPU 22 such that it can generate a bill to be sent to the client or a receipt indicating that the consumer's credit card has been charged for the requested transaction. Though it is preferred that billing PC 32 be a personal computer, it is envisioned that billing PC 32 simply comprise a printing device connected to CPU 22 which generates printed bills based on the commands received from CPU 22.

The present invention allows for one or more warehouses or factories from which the product or products ordered by consumer 10 will be shipped. If there are more than one, CPU 22 will preferably select the geographically closest warehouse to the delivery address. CPU 22 will send the order information to a warehouse PC 40 corresponding to the selected warehouse via link 50d. Like billing PC 32, it is preferred that warehouse PC 40 is a personal computer but, alternatively, could some other data conveyance mechanism such as a printer, facsimile, or computer-automated voice mail service. Preferably, warehouse PC 40 has the capability of generating a mailing label, using a printer or other such device, said label containing the consumer's delivery address information such that the label can be applied to the outgoing product or products for shipment.

One of the functions of CPU 22 is to determine a retail specialty shop or boutique to which a share of the profit of the sale is to be forwarded in order to preserve an effective business relationship between the producer and the retailers. Selection of the boutique is based either on proximity to the product delivery address, or selected by consumer 10 during the ordering process. In order to effect this payment, CPU 22 is connected via link 50e to payment PC 42. Again, payment PC 42 could be a printer, facsimile or other such device, but is preferably a personal computer. It is envisioned that a payment PC 42 be located in each boutique. Alternatively, payment PC 42 could store payment data for a variety of boutiques and generate payment checks, either paper or electronic, on a predetermined frequency, such as monthly, for delivery to the boutiques or their accounts. Any a known accounting practices could be used to perform this function.

Computing Process

Figure 2:
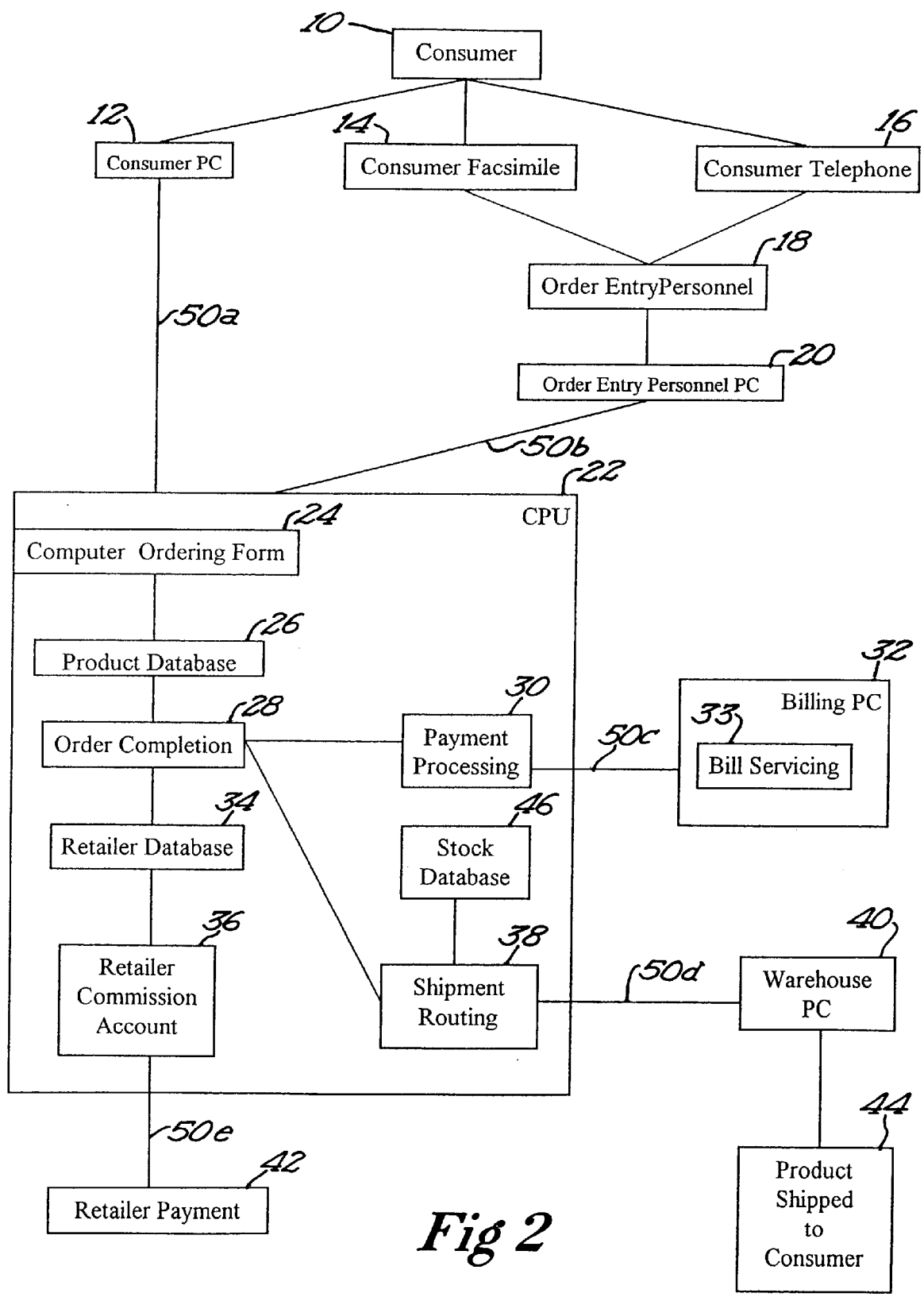
FIG. 2 is a diagram charting the steps of the computer-facilitated selling process of the invention; and, FIG. 3 is a diagram charting the consumer-related steps of process invention.

FIG. 2 diagrams the system of the present invention including devices and processing steps taken to effect the present shows a series of steps taken by people and devices to effect the present invention. A consumer 10 is in need of a product which is available only through specialty retailers such as salons or boutiques or through the present invention. The consumer 10 does not wish to make a special trip to specialty retailer in order to purchase the product so consumer 10 opts to purchase the product through the present invention. Consumer 10 starts the process by establishing communication with central processing unit (CPU) 22. This is done by using personal computer (PC) 12 or by contacting order entry personnel 18 via facsimile 14 or telephone 16. Order entry personnel then enter the provided data into PC 20. PC 12 and PC 20 are in data flow communication with CPU 22 over link 50. This communication could be established using a modem and a network connection such as the Internet, a simple computer to computer connection using modems and a telephone or cable connection, or directly connected using a computer communication line. Preferably, the Internet is used such that a wide variety of consumers 10 may establish communications with the CPU 22 using their own PCs 12.

Once communications are established between CPU 22 and PC 12 or PC 20 over link 50a or 50b, CPU 22 requests specific information by providing the consumer 10 or order entry personnel 18 with a computer ordering form 24. Computer ordering form 24 comprises a plurality of fields, both mandatory and optional. Mandatory fields request information which must be provided by the consumer in order to effect the transaction. Optional fields request information which, if not supplied, will be calculated by CPU 22. Mandatory fields may request, but are not limited to, such information as consumer name, desired product destination address, desired billing method, and products desired. It is envisioned that the ordering form will access product database 26 to provide consumer 10 with a menu of available products from which to choose items desired for purchase and their current prices. Optional fields may request information which would otherwise be calculated by CPU 22 such as the specialty retail store which the consumer normally frequents. Again, it is envisioned that CPU 22 contain a database of retail shops and boutiques which carry the producer's products. Consumer 10 would preferably be provided a list of shops generated by CPU 22 and determined by geographic proximity to the consumer's 10 zip code. This information is not only used for marketing purposes, but also to determine to which shop a share of the profits should be forwarded. Optional fields may additionally request other marketing information such as age, gender, product usage, and the like.

Once CPU 22 has been provided all of the required information, CPU 22 performs certain calculative steps. Payment processing step 30 preferably includes such computations as the total cost of the products selected by the consumer, sales. tax and shipping costs. It is envisioned that payment processing step 30 also includes checking for an existing customer account balance and adding the order cost to the existing balance. The result of the payment processing step 30 is sent from CPU 22 to billing PC 32 which performs bill servicing function step 33. Bill servicing function step 33 depends on the desired billing method selected by the consumer. It could comprise credit card verification and processing or simply the printing of a bill to be sent to consumer 10.

CPU 22 also performs shipment routing step 38 by computing the geographically closest warehouse or supplier to the product destination address provided by consumer 10. It is envisioned that CPU 22 may access a stock databank 46 containing stock information pertaining to each warehouse in order to confirm that the selected warehouse contain sufficient quantities of the desired products. Once the shipment routing step 38 calculations have been performed, information is sent via link 50d to warehouse PC 40 such that the desired products may be packaged and shipped to consumer 10. Stock database 46 is then updated to reflect the decrease in stocked products at the selected warehouse.

In order to preserve effective retailer-supplier business relations, retail business cannot be negatively affected by the present invention. In other words, if consumers are allowed to purchase products directly from the supplier or wholesaler, the retailer that would have otherwise enjoyed the sale must still receive some or all of the profits of the transaction. During the process of filing out computer ordering form 24, consumer 10 either selected a desired retailer from a list generated by CPU 22, or left the optional field blank, thereby allowing CPU 22 to determine the geographically closest retailer to the product destination address. In generating this list, CPU 22 accessed retailer database 34. After a retailer is selected, CPU 22 performs calculations to determine the correct credit to be applied to retailer commission account 36. These calculations are performed based on the quantities products purchased and a predetermined profit margin associated with each product. The results of these calculations are sent via link 50e to payment PC 42 along with consumer information such that the retailer is privy to the same marketing information it would have if the purchase were made by the consumer 10 in person.

Consumer Process

Figure 3:
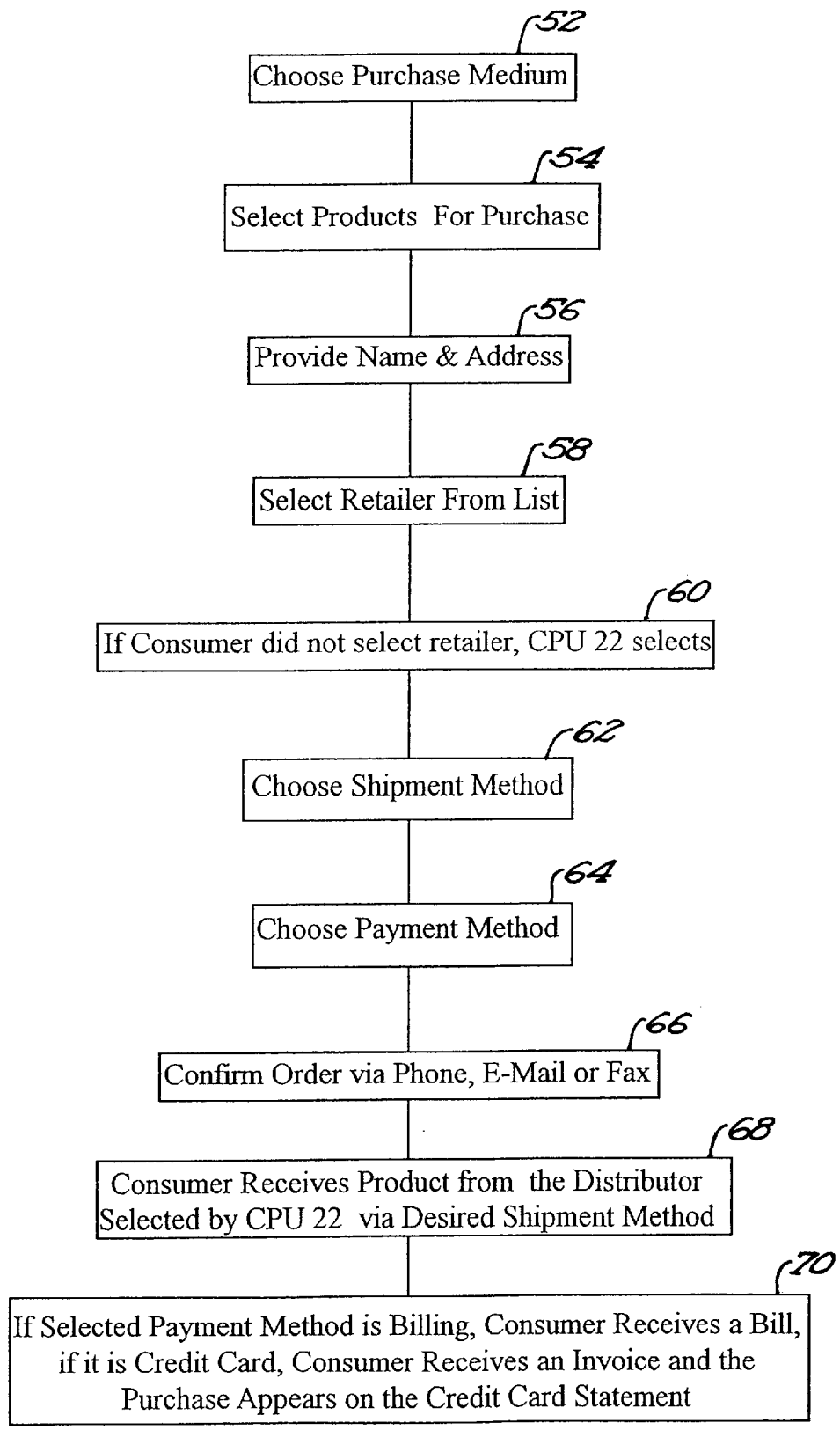

FIG. 3 shows the steps consumer 10 follows and experiences when making a purchase utilizing the present invention. As shown at step 52, consumer 10 first chooses the medium over which he or she will place the order. If consumer 10 has access to a consumer PC 12, consumer 10 will usually find this medium most convenient. Otherwise, consumer 10 may place the order with OEP site 17 by communicating with OEP 18 using any facsimile 14 or telephone 16. OEP 18 would then enter the information into OEP PC 20. Upon establishing communications with CPU 22, consumer 10 (or OEP 18) is presented with computer ordering form 24.

Form 24 directs consumer 10 to make decisions and supply information. At step 54, consumer 10 must select the products desired for purchase from a list generated by CPU 22 accessing data from its product database 26. This list could update itself periodically or be updated by an employee. Form 24 also requests information from consumer 10 such as, but not limited to, name and address at 56.

As consumer 10 continues to fill out form 24, consumer 10 is asked at step 58 to select a preferred retailer from a list provided by CPU 22 which it generates by accessing retailer database 34. Consumer 10 is given the option, at step 60, to allow CPU 22 select the geographically closest retailer to the address given. Finishing form 24, consumer is directed to choose a desired shipment method at step 62 and a desired payment method at step 64. It is envisioned that any payment and shipment methods be used with the present invention, conventional or otherwise. A preferred embodiment also provides consumer 10 with a choice of communicative media over which order confirmation notification will be provided at step 66.

After receiving confirmation at step 66, the consumer will receive the product at step 68 from the distributor selected by CPU 22, delivered via the shipment method chosen at step 62. Finally, at step 70, the consumer will receive a bill for the order. If the payment method chosen at step 64 was a credit card or similar credit arrangement, consumer will receive an invoice or receipt showing that the account was charged for the purchase. Receipt of a bill or receipt at step 70 can occur before, with, or after receipt of the product at step 68.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A system for routing electronic data to effect a sale of ordered products from at least one supplier to a consumer having a consumer address and to provide compensation to a third party retailer for lost profits associated with said sale comprising:

a central processing unit;

at least one remote device for sending and receiving data to and from the central processing unit;

a communications link between the central processing unit and the at least one remote device providing a conduit for electronic data to flow between the central processing unit and at least one remote device;

a data storage device operatively connected to the central processing unit having addresses for a plurality of third party retailers for allowing the central processing unit to determine the geographically closest third party retailer to the consumer address, said central processing unit having running thereon at least one computer program that determines the identity of the geographically closest third party retailer to the consumer address, calculates the appropriate compensation to be designated for receipt by a selected third party retailer, and credits an account owned by the selected third party retailer, wherein said third party retailer has no participation in the transaction between the supplier and the consumer.

2. The system of claim 1 wherein the communications link comprises:

the Internet.

3. The system of claim 1 wherein the communications link comprises:
a telephone line.

4. The system of claim 1 wherein the communications link comprises:
a coaxial cable.

5. The system of claim 1 wherein the communications link comprises:
a fiber optic cable.

6. The system of claim 1 wherein the remote device comprises:
a personal computer.

7. The system of claim 1 wherein the remote device comprises:
a telephone.

8. The system of claim 1 wherein the remote device comprises:
a facsimile machine.

9. The system of claim 1 wherein the data storage device comprises:
a hard disk drive.

10. The system of claim 1 further comprising:
an order entry site accessible by telephone or facsimile for communicating with said consumer and entering information into said remote device.

11. The system of claim 1 further comprising:
at least one remote output device in electronic communication with the central processing unit for transmitting data associated with the sale and results of compensation calculations made by the central processing unit to the third party retailer.

12. The system of claim 1 wherein the selected third party retailer is the geographically closest third party retailer to the consumer address, determined by the central processing unit.

13. The system of claim 1 and further comprising:
a data base of supply source addresses to allow the central processing unit to select the supply source geographically closest to the consumer's address for shipment of the ordered products to the consumer.

14. A system for routing electronic data to effect a sale of ordered products from at least one supplier to a consumer having a consumer address and to provide compensation to a third party retailer for lost profits associated with said sale comprising:
a central processing unit;
at least one remote input device for transferring data between the central processing unit and the consumer;
a communications link between the central processing unit and the at least one remote input device providing a conduit for electronic data to flow between the central processing unit and at least one remote input device;
at least one remote output device for transferring information between the central processing unit and the supplier;
a communications link between the central processing unit and the at least one remote output device providing a conduit for electronic data to flow between the central processing unit and at least one remote output device;
a data storage device operatively connected to the central processing unit and having addresses for a plurality of third party retailers for allowing the central processing unit to determine the geographically closest third party retailer to the consumer address, said central processing unit having running thereon at least one computer program that calculates the appropriate compensation to be designated for receipt by a selected third party retailer and credits an account of the selected third party retailer and wherein said third party retailer is an entirely passive participant in the transaction between the supplier and the consumer.

15. The system of claim 14 and further comprising:
a data base of supply source addresses to allow the central processing unit to select the supply source geographically closest to the consumer's address for shipment of the ordered products to the consumer.

16. A method of using a computer to effect the sale of products between a supplier and an end product user comprising the steps of:
inputting the addresses of a plurality of authorized retailers of said products into a central processing unit for storage in a data storage device operatively connected to the central processing unit;
receiving electronic order information from the user via a remote input device, the information containing at least identity of products desired for purchase and desired delivery address;
comparing the desired delivery address to the plurality of addresses of authorized retailers stored in the data storage device;
generating a list of all retailers within a predetermined geographic range of the delivery address;
transmitting the list to the user and giving the user an option to choose a retailer from the list, or to allow the central processing unit to select a retailer;
receiving the user's choice at the central processing unit;
designating the retailer chosen by the user as the retailer to be compensated or, if the user did not choose a retailer, determining the geographically closest retailer to the delivery address and designating that retailer as a retailer to be compensated;
sending the order information to the supplier such that the supplier may ship to the user the products desired for purchase; and,
crediting the designated retailer for the transaction, the designated retailer having had no input into the transaction.

17. The method of claim 16 and further including:
generating summaries of communications with the user.

18. The method of claim 16 and further including:
storing in the data storage device the addresses of a plurality of shipping locations of the supplier and determining the shipping location geographically closest to the delivery address.

19. The method of claim 18 and further including:
shipping the desired products from the geographically closest shipping location determined.

20. A system for routing electronic data to effect a sale of products from at least one supplier to a consumer having a consumer address and to provide compensation to a third party retailer for lost opportunity costs associated with said sale comprising:
a central processing unit;
at least one remote input device for receiving and transmitting communications in a form suitable to be received by the central processing unit, and for receiving communications from the central processing unit and displaying communications in a form understandable by the consumer;

a communications path between the central processing unit and the at least one remote input device allowing communications to flow between the central processing unit and at least one remote input device;

a data storage device operatively connected to the central processing unit and containing address data pertaining to the geographical locations of at least one remote supplier and a plurality of remote sites;

the central processing unit having the ability to access the data stored in the data storage device and determine the geographically closest remote supplier and geographically closest remote site to a given consumer address;

the central processing unit further having the ability to create a class of remote sites which are located within a predetermined geographic proximity to a given consumer address; and, whereby said central processing unit includes a computer program that makes calculations to determine appropriate compensation to be designated for receipt by a third party retailer in the class of remote sites located within the predetermined geographic proximity and credits the third party retailer at the calculated compensation level, said third party retailer having no input into the transaction between the supplier and the consumer.

21. The system of claim 20 wherein the remote input device further comprises:

a personal computer.

22. The system of claim 20 wherein the communications path further comprises:

a network.

23. The system of claim 22 wherein the network further comprises:

the Internet.

24. The system of claim 20 wherein the storage device further comprises:

a hard disk drive.

25. The system of claim 20 wherein the storage device further comprises:

Random Access Memory.

26. The system of claim 20 wherein the storage device further comprises:

magnetic media storage.

27. The system of claim 20 wherein the at least one remote output device further comprises:

a printer.

28. The system of claim 20 further comprising:

at least one remote output device operatively connected to the central processing unit for generating summaries of communications with said at least one remote input device.

29. The system of claim 28 wherein at least one remote output device further comprises:

a personal computer.

30. The system of claim 28 wherein the at least one remote output device further comprises:

a printer.

31. The system of claim 28 wherein the at least one remote output device further comprises:

a facsimile machine.

32. The system of claim 20 and further comprising:

at least one remote communications device, operatively connected to the central processing unit for providing electronic communication between the central processing unit and the at least one remote supplier.

33. The system of claim 32 wherein the remote communications device comprises:

a personal computer.

34. The system of claim 32 wherein the remote communications device comprises:

a facsimile machine.

35. The system of claim 32 wherein the remote communications device comprises:

a printer.

36. The system of claim 32 wherein the remote communications device comprises:

a telephone.

37. The system of claim 20 wherein the at least one remote supplier further comprises:

factories.

38. The system of claim 20 wherein the at least one remote supplier further comprises:

warehouses.

39. The system of claim 20 wherein the at least one remote supplier further comprises:

wholesalers.

40. The system of claim 20 wherein the remote sites further comprise:

retail shops.

41. The system of claim 20 wherein the remote sites further comprise:

salons.

42. The system of claim 20 wherein the communications further comprise:

orders.

* * * * *